United States Patent [19]

Bricot

[11] Patent Number: 4,513,407
[45] Date of Patent: Apr. 23, 1985

[54] DEVICE FOR OPTICAL RECORDING AND READ-OUT OF DATA ALONG A PRERECORDED TRACK

[75] Inventor: Claude Bricot, Paris, France
[73] Assignee: Thomson-CSF, Paris, France
[21] Appl. No.: 395,307
[22] Filed: Jul. 6, 1982

[30] Foreign Application Priority Data

Jul. 17, 1981 [FR] France .................. 81 13979

[51] Int. Cl.³ .................. G11B 7/00; G11B 21/10
[52] U.S. Cl. .................. 369/44; 369/111; 369/277; 369/275
[58] Field of Search .............. 369/44, 111, 277, 279, 369/275, 109, 112; 346/76 L; 365/124, 127; 250/202

[56] References Cited

U.S. PATENT DOCUMENTS

| | | | |
|---|---|---|---|
| 3,171,744 | 3/1965 | Peticolas | 96/49 |
| 3,314,073 | 4/1967 | Becker | 346/76 L |
| 3,644,014 | 2/1972 | Hirschberg | 346/76 R |
| 3,913,076 | 10/1975 | Lehureau | 369/44 |
| 3,983,317 | 9/1976 | Glorioso | 369/111 |
| 4,032,691 | 6/1977 | Kido | 428/304 |
| 4,176,377 | 11/1979 | Howe | 346/76 L |
| 4,313,188 | 1/1982 | Bartolini | 346/76 L |

FOREIGN PATENT DOCUMENTS

| | | | |
|---|---|---|---|
| 33046 | 8/1981 | European Pat. Off. | 346/76 L |
| 38499 | 10/1981 | European Pat. Off. | 369/111 |
| 2048431 | 4/1972 | Fed. Rep. of Germany | 369/111 |
| 2217761 | 9/1974 | France | 369/111 |
| 2365854 | 9/1976 | France | 369/111 |
| 2064847 | 6/1981 | United Kingdom | 369/111 |

OTHER PUBLICATIONS

Patent Abstracts of Japan, vol. 5, No. 88 (p. 65) Jun. 9, 1981.

Primary Examiner—Alan Faber
Attorney, Agent, or Firm—Cushman, Darby & Cushman

[57] ABSTRACT

The invention relates to optical devices enabling writing and reading of data on a disc comprising a preformed pattern, the recording and reading operations utilizing a lighting spot able to illuminate only a single track element at a time. The invention provides a preformed pattern such that the spot overlaps on the track elements bordering a track interstice and vice versa, in such manner as to obtain a preformed contrast which can be accentuated by recording the data. The invention is applicable in particular to the recording of video frequency signals and to storing digital data on a disc.

11 Claims, 9 Drawing Figures

DEVICE FOR OPTICAL RECORDING AND READ-OUT OF DATA ALONG A PRERECORDED TRACK

BACKGROUND OF THE INVENTION

The present invention relates to optical devices enabling the recording of data along a track prerecorded on the surface of a disc-shaped carrier. The date writing operation is performed by means of an optically modulated beam of radiation which projects a spot of small size on the disc surface. The prerecorded track is formed by concentric turns of which the spacing is such that the spot may illuminate only a single turn. A spot having dimensions of the order of one micron is obtained by focussing a laser beam with a lens, which renders it possible to secure a high power density for data writing and, thanks to the closeness of the turns, a high-density storage facility. In view of the small spot size, the optical properties of the prerecorded surface largely depend on diffraction phenomena. Thus, when a smooth surface of the disc is illuminated, the reflection of light or the transmission of light occur with a solid angle which corresponds to the angular aperture of the lighting beam. By intercepting the light emerging from a smooth illuminated surface, a maximum of illumination may be observed in a detection plane. On the contrary, if the spot illuminates a disc area comprising a surface irregularity, the solid angle with which the reflected or transmitted radiation emerges may be wider than the angular aperture of the lighting beam. The detection of a surface irregularity may be made apparent by a darkening effect, since a proportion of the emergent radiation is not intercepted by the detector system.

In the case of optical write-read devices utilising a prerecorded data carrier, a surface relief comprising a low level and a high level is adopted for the prerecorded track. A central cross-section of the prerecorded disc displays an alternation of depressions and prominences defining two imbricated grids, the one comprising the track elements and the other the track interstices. The track interstices bordering a track element form a structure which must be followed by the spot whilst the latter remains as centred on the track as possible. To this end, a radial control is provided in order to tend to cancel out any deviation from the track. The detection system should be able to establish a clear distinction between the track and the two track interstices bordering the same. This distinction is based on a contrast of intensity which does not depend on the relief direction but on the radial dimensions given to the surface irregularities as compared to the lighting spot. The data recording action commonly has the result of altering the optical characteristics of the track, but this alteration may cause defective operation of the system for the detection of deviations in following the track.

With a view to overcoming this disadvantage, the invention provides a particular dimensioning of the prerecorded structure which in predetermined lighting conditions provides an accentuation of the contrast between the track and the "pretracks" by virtue of recording the data.

SUMMARY OF THE INVENTION

The invention has as its object an optical device for the recording and playback of data on and from a disc bearing a prerecorded system formed by concentric track elements alternating with track interstices, the said device comprising lighting means intended to provide a spot lighting only one track element at any one time, means of detecting a radiation emerging from the disc area scanned by the said spot in order to detect a radial deviation of the said spot from the said track element, and means compelling the said spot to follow the said track element, characterised in that when the said spot is centred on a track interstice, it encroaches on to the track elements which border the same, and that when it is centred on a track element, the said spot encroaches on the track interstices bordering the same; one of these encroachments being greater than the other so as to produce a contrast between the track elements and the track interstices; the recording of the recordable layer carried by the said disc tending to accentuate the said contrast.

BRIEF DESCRIPTION OF THE DRAWINGS

A clearer understanding of the invention will be gained from the following description and from the accompanying drawings, in which.

DESCRIPTION OF THE PREFERRED EMBODIMENTS

Figure 1:
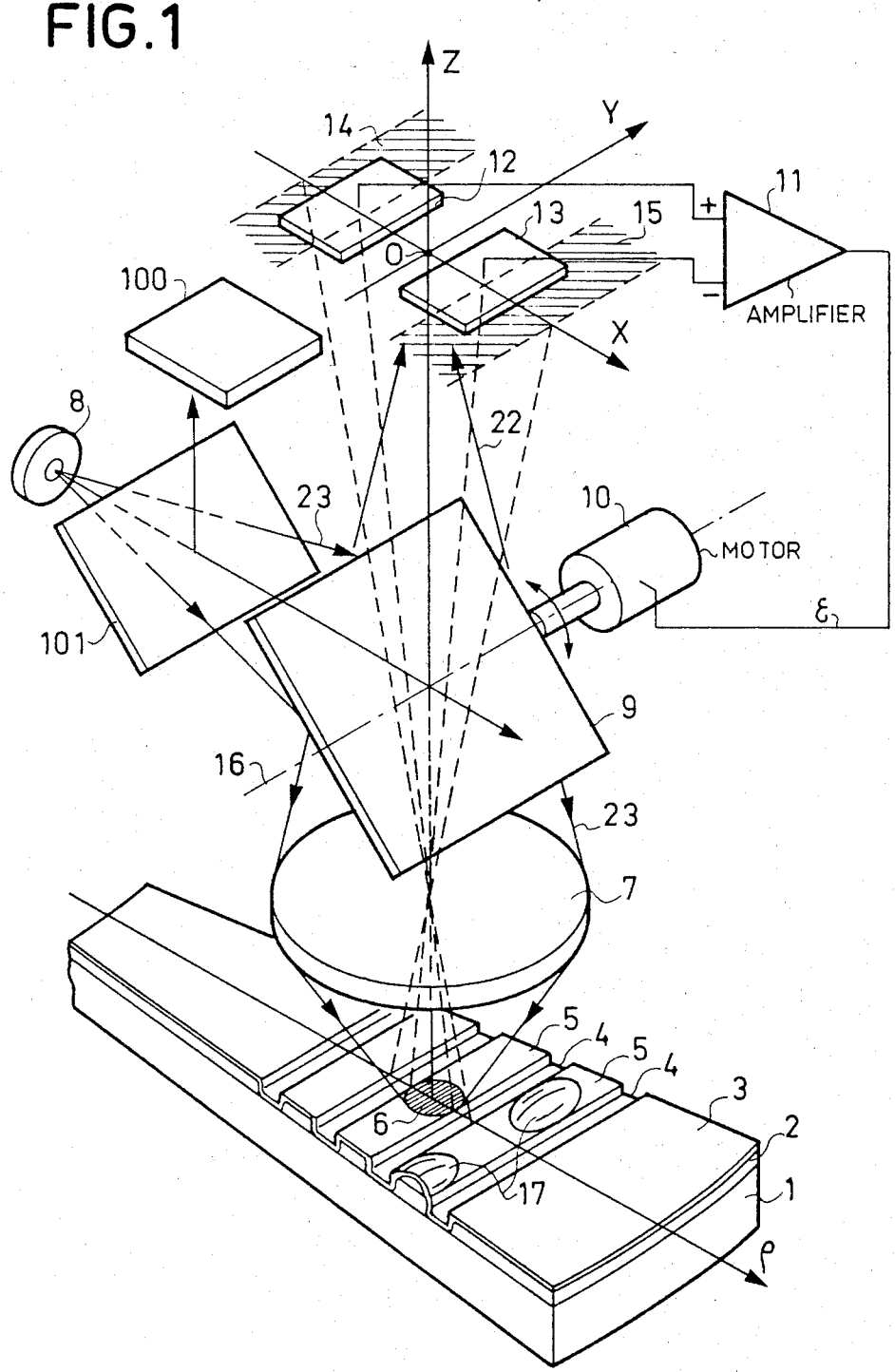
FIG. 1 is a partial isometric view of one embodiment of a write-read device in accordance with the invention.

FIG. 1 illustrates, reduced to its essentials, an optical device intended to write and read data on and from a disc. A disc portion which may receive a recording by the thermo-optical method has been illustrated on a highly exaggerated scale. More particularly, this is a structure comprising a support 1 carrying a substrate 2 of thermodegradable material, in which have been formed grooves or prerecorded troughs 4 forming separations between several annular areas 5 forming track elements. The substrate 2 is covered by a thin metal layer 3 which may plastically deform under the effect of a recording radiation to form a ring of surface irregularities 17 constituting the subsequent recording on the disc.

Before being exposed to the action of a recording radiation, the track elements 5 are smooth, as are the depressions 4 forming the track interstices. In practice, the track elements 5 are produced along equidistant concentric circles, or along the consecutive turns of a spiral. An analogous arrangement is adopted for the track interstices.

The data write and read operations on a disc of this kind require the projection of a light spot, 6. To this end, a source of radiation 8 transmits a beam of light 23 which, after having passed through the semi-transparent sheet 101, is reflected by a mirror 9 in the direction of the centre of a projection lens 7. This beam 23 is focussed by the lens 7 on the surface 3 of the disc. The spot 6 may be displaced radially along the radius $p$ by causing the mirror 9 to pivot around the axis 16. A motor 10 provides the control for the radial displacement of the spot 6. The scanning of the track elements 5 is effected by causing the disc 1,2,3 to turn around an axis parallel to the optical axis Z of the lens 7. However, the eccentricity of the track elements requires a radial control over the spot 6 in order to be certain that it is centred on the track. This control operation presupposes that there is detected any deviation $\Delta\rho$ of the centre of the spot 6 from the axis of the track. To this end, it is possible to incorporate a system for detecting radial deviations from the track. This detector system is denoted by the block 100 in FIG. 1. The block 100 receives the radiation issuing from the disc area illuminated by the spot 6. This radiation is picked up by the lens 7 and directed towards the block 100 via the mirror 9 and member 101. To simplify FIG. 1, the reverse reflection of the light has been illustrated as though there were no reflector elements 9 and 101. This procedure makes it possible to show along the optical axis Z a detection plane XY which is actually situated within the block 100. The images of the two track interstices 4 which border the track element 5 on to which the spot 6 is projected are illustrated by hatched strips 14 and 15 in this detection plane. The point O of the detection plane XY is optically coupled to the transmission centre of the source 8 via the lens 7 and the three reflective elements which are the layer 3, the member 101 and the mirror 9. The images 14 and 15 of the track interstices are thus displaced along the axis X when the spot 6 is displaced along the radius $\rho$. The result is that a radial deviation from alignment may be detected by placing two photodetector elements 12 and 13 in the detection plane. The electrical voltages supplied by the photodetector elements 12 and 13 are fed to the two input terminals of a comparator circuit 11 which delivers a differential signal $\epsilon$. The signal $\epsilon$ is fed to the motor 10 so that the alignment deviation detected may be compensated by servocontrol. The track alignment sensor which has been described is not the only one which may be considered. It would equally be possible to have recourse to a spot wobble or track wobble sensor as well as to a double spot sensor.

The important feature which should be examined is the amplitude contrast obtained in the detection plane XY.

Figure 2:
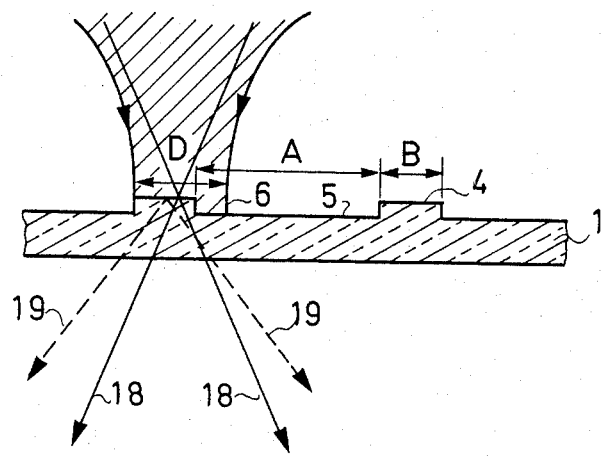
FIGS. 2 to 4 are explanatory figures.

A central cross-section of a prerecorded disc 1 has been illustrated in FIG. 2. This kind of impression may be obtained by starting with a matrix on which is spread a photopolymerisable material which is covered by a transparent carrier disc. A premarked disc is obtained after insolation. The radially measured widths A and B indicate, respectively, the widths of a track 5 and of a track interstice 4. The lighting beam of the disc is the hatched constriction zone in FIG. 2. Its base corresponds to the spot 6 which has a diameter D. The rays 18 are marginal rays delimiting the angular aperture of the lighting beam. When the spot lights up a track interstice 4 having a width B smaller than its diameter D, the consequence of the diffraction effect is that the rays issuing from the disc spread within a solid angle delimited by the marginal rays 19. The detector system which picks up the radiation issuing from a track interstice 4 will perceive this element in the form of a darker strip than that which it would have perceived in the absence of a relief. When the spot 6 is positioned in the middle of the track 5 and if A>D, it is apparent that there is no diffraction effect, so that the detection system perceives the track 5 more clearly than the track interstice 4. A good amplitude contrast is consequently obtained between the track 5 and the track interstice 4. However, it is necessary to point out that the arrangement adopted in FIG. 2 has shortcomings as regards complete knowledge of the deviation in alignment of the spot 6 from the track 5. As a matter of fact, since A is greater than D, there is a range spread A−D for which the deviation metering signal remains zero.

Figure 3:
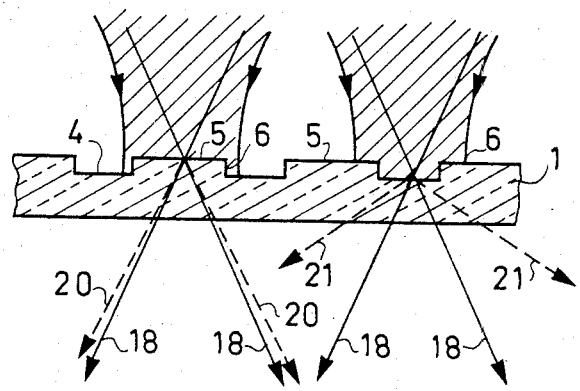

In practice, it is consequently necessary to adopt the arrangement illustrated in FIG. 3. It is apparent that the sopt 6 centred on a track element 5 overlaps a little on to the track interstices 4 which border the same, and that the spot 6 centred on a track interstice 4 overlaps to a greater extent over the track elements 5 which border the same. This arrangement may be expressed mathematically, as follows:

$$D>A; D>B; D-A<D-B$$

Regarding the diameter D of the lighting spot 6, it should be recalled that there are two possibilities of definition. Assuming the centre of the lens to receive a uniform illumination, the spot is formed by the AIRY disc whose diameter d is given by the formula $$d=1.22\lambda/\sin u$$

in which $\lambda$ is the wavelength and sin u the numerical aperture of the lens.

It may equally be assumed that the lighting distribution is Gaussian within the region of the lens centre. The spot diameter for the same lens and the same wavelength is then 15% greater than the diameter given by the formula recalled above. The result of the choice specified is that the radiation emerging from a track element 5 is contained within a solid angle 20—20 a little wider than the aperture angle of the beam 18—18, whereas the radiation emerging from a track interstice 4 is contained within a solid angle 21—21 of distinctly greater aperture.

Figure 4:
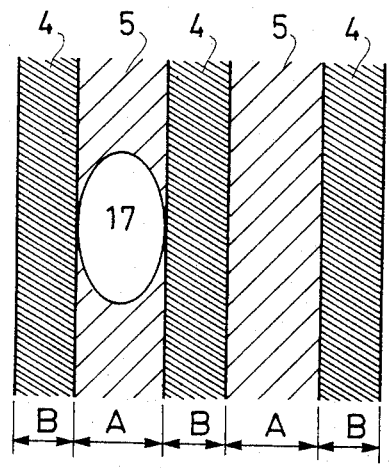

FIG. 4 is an illustration of the illuminations received in the detection plane XY of FIG. 1. The track interstices 4 appear darker than the track elements 5 which provides a contrast for detection of the deviation from a track by means of the photodetectors 14 and 15.

It remains to point out that FIGS. 2 and 3 illustrate a prerecorded or premarked disc which is still blank. If, as shown by FIG. 1, the spot 6 has produced on a track element the surface irregularities 17 representing the recording as such, this may give rise to a local lightening of the track element as illustrated in FIG. 4, or the opposite effect. Assuming a recordable layer producing the opposite effect, the spot 17 would have to be darkened as compared to the track element 15 which would cause a loss of contrast.

Figure 5:
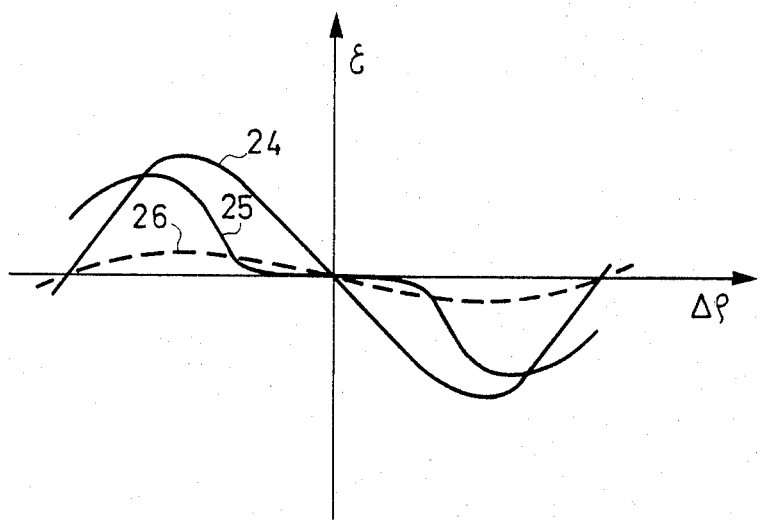
FIG. 5 illustrates characteristics of the detection of a radial deviation from the track.

FIG. 5 is a diagram giving the value assumed by the error signal available at the output terminal of the comparator 11 as a function of the deviation $\Delta\pi$ from the track. The discrimination curve 24 is that observed before recording on the disc. The curve 25 applies to a premarked pattern of which one of the widths A or B exceeds the spot diameter D. The curve 26 illustrates a perceptible loss of sensitivity caused by an engraving which darkens the track element. If the darkening caused by the engraving is more substantial, a phase inversion which destabilises the track following action may even be observed.

It is thus apparent that the prescored pattern should be selected as a function of the "engraving" action. More specifically, it may be said that the cutting effect should intensify the track to track interstice contrast, since in this way an assurance of maintaining a stable track following action is provided. It should be added moreover that the spot should at least slightly overlap the bordering track interstices, so that the servocontrol may operate even if the track course deviation is minimal.

The recordable layer of FIG. 1 is a layer of which the thermo-optical deformation causes an increase in the capacity of reflection. The result illustrated in FIG. 4, that is to say a contrast intensification, is obtained with the preformed outline of FIG. 3.

By way of non-limiting example, it is possible to produce a preformed disc comprising track gaps in the form of depressions having a width of 0.6 micron bordering projecting track elements of a width of 1.4 micron. A recordable layer formed by a thin metal film deposited on a substrate of a material degradable at low temperature assumes the outline of the preforming. Prior to recording, the metal layer adheres to the substrate and the whole is dimensioned in such a manner as to produce a weak reflection of an incident radiation having a wavelength of $\lambda = 0.6328$ micron. This radiation originates from a laser and is focussed on the disc by means of a lens having a numeric aperture $NA = 0.45$. The spot projected on the recordable layer has a diameter of 1.7 micron which causes the track element to appear a little darker than a smooth part of the layer. The track interstices appear perceptibly darker, which assures a satisfactory contrast for reading the preformed pattern. During recording, the localised detachment of the metal film by a gaseous release originating from the substrate causes an increase in the reflective capacity of the layer, which causes an intensification of the reading contrast. The recording action which has been described does not cause any tearing of the metal film, since it undergoes a plastic deformation without reaching the breaking strain.

The invention is not limited to the example specified.

Figure 6:
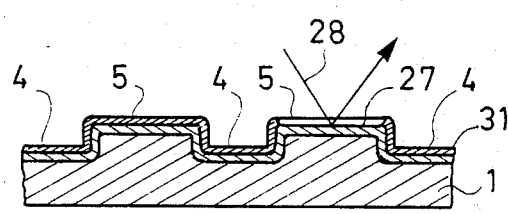
FIG. 6 is an illustration as a central cross-section of a disc structure operating by thermal ablation.

Shown in FIG. 6 is a central cross-section of the preformed disc in which the preformed outline carried by the substrate 1 has been coated with a sub layer having a high degree of reflectivity on which has been deposited a film 31 of lesser reflectivity. The film 31 is produced from a material which is volatilised when the recording laser radiation is applied to the same locally. FIG. 6 shows a track element in the untouched state at the left, and at the right a track element 5 which has undergone thermo-optical ablation. In this case, the sub layer 27 is exposed by local removal of the film 31, and if the detection of the track course deviation is performed by reflection of the lighting radiation 28, an intensification of the contrast between the tracks and track interstices is again obtained.

Figure 7:
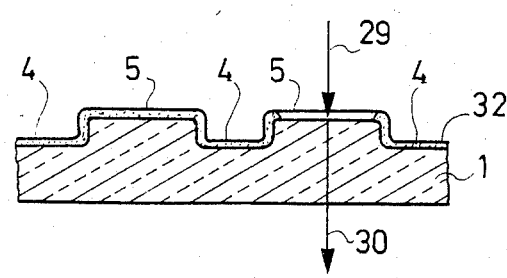
FIG. 7 is an illustration as a central cross-section of another disc structure operating by thermal ablation.

The invention is equally applicable to the detection of the radiation transmitted by the disc. The central cross-section of FIG. 7 illustrates a carrier 1 of transparent material which has undergone a preforming operation and on which has been deposited a semi-transparent and thermodegradable film 32. The track element 5 illustrated at the left is in the untouched state, and the track element 5 situated at the right has undergone an ablation by the lighting radiation 29. The intensity of the transmitted radiation 30 is increased by the recording which tends to intensify the contrast of the preforming.

It is apparent from the preceding examples that the track element is a projection and has a greater width than the track interstices, which is referred to as "white" track preforming.

The complementary situation equally lies within the ambit of the invention.

Figure 8:
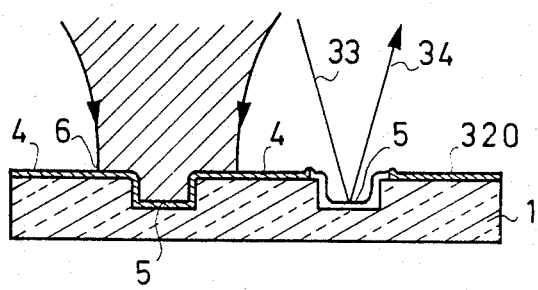
FIG. 8 is an illustration as a central cross-section of a disc structure also operating by thermal ablation.
Figure 9:
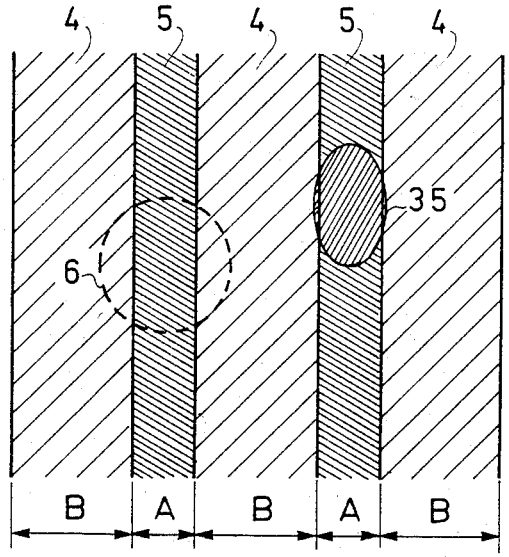
FIG. 9 is an explanatory figure.

The central cross-section of FIG. 8 illustrates a carrier 1 of which the preforming comprise groove-like track elements 5 separated by projecting track interstices 4. The carrier 1, which may be transparent, is covered by a film 320 impressionable by thermo-optical ablation. The lighting beam provides a spot 6 of a diameter a little greater than the width of the track interstices 4. The track elements 5 are narrower than the track interstices 5 which makes it possible to obtain the preforming contrast shown in FIG. 9. This contrast is that observed with a detection system exploiting the reflected radiation 34 which is transmitted by the disc when it receives the lighting radiation. The track element illustrated at the left in FIG. 8 is in the untouched state and appears in FIG. 9 in the form of a dark strip bordered by lighter areas corresponding to the track interstices 4. The track element 5 illustrated at the right in FIG. 8 has undergone a local thermo-optical ablation which reduces the reflectivity of the disc. This ablation corresponds to an area 35 darker than the track 5, in FIG. 9. It is thus apparent that the recording effect intensifies the preforming contrast since the demarcation between the track element and the track interstice is even more distinctive.

It is apparent from the preceding that the direction of a preformed outline is of little importance, but that the width ratio should differ from unity in a direction which corresponds to a contrast which is intensified when the data are recorded on the track. It is equally necessary to make provision for the spot to overlap the two track interstices bordering a track element, since the track following operation should not comprise any inoperative area. Finally, it is taken for granted that the spot should illuminate no more than one track element at a time, to prevent any diaphoty and assure optimum concentration of the recording radiation. The invention is applicable to any system comprising a layer recordable with or without ablation. Multilayer as well as monolayer recording surfaces may be envisaged. It is necessary to observe that the preformed pattern may comprise on the track elements, surface irregularities analogous to the recording signals. Irregularities of this kind make it possible to effect an addressing of the track elements and also to subdivide into sectors each turn of the annular area set aside for data recording.

What is claimed is:

1. An optical device for recording and playback of information on and from an optical post recordable data carrier having a preformed pattern relief surface consisting of alternating track elements and lands to thereby define an optical track, said device comprising:

illuminating means for illuminating a scanned area of said track elements with spot illumination, said illuminating means being shiftable between centers of said track elements and said lands;

detecting means collecting radiation from said scanned surface area for detecting deviation of said spot illumination from said track elements and for generating a deviation signal in response to said detected deviation; and control means operatively connected to said detecting means for receiving said deviation signal and for moving said spot illumination in response thereto to maintain tracking of said spot illumination on said track elements, and wherein said illuminating means for (a) producing spot illumination on a center of a predetermined one of said lands to form overlapping regions with adjacent ones of said track elements, (b) producing spot illumination on a center of a predetermined one of said track elements to form overlapping regions with adjacent ones of said lands upon shifting of said illumination means from the center of said predetermined land to the center of said predetermined track element and (c) establishing a prerecording optical contrast having a predetermined sign when said spot illumination shifts from a center of said predetermined one of said track elements to the center of an adjacent one of said lands; and wherein recording of said information produces a post recording optical contrast having said predetermined sign when said spot illumination is shifted from a post recorded area of one of said track elements to the adjacent land.

2. Optical device for recording and playback of information on and from a preformated optically postrecordable data carrier having a surface wherein a prerecorded relief is formed, said prerecorded relief defining a pattern consisting of coextensive track elements alternately arranged with intertrack lands, said optical device comprising illuminating means for providing a spot illuminating only one of said track elements at a time, means collecting radiation issuing from the area of said surface scanned by said spot for detecting an amount of mistracking of said spot in relation with said one track element, and means controlled by said detected amount of mistracking for urging said spot to follow said one track element, wherein:

(a) said spot being centered on an intertrack land, it overlaps on the track elements bordering the same, (b) said spot being centered on one of said track elements, it overlaps on the intertrack lands bordering the same, (c) one of said overlaps being greater than the other for establishing a prerecording optical contrast having a predetermined sign upon shifting said spot from one of said track elements to the neighboring intertrack land, and (d) the recording of said information producing a post recording optical contrast having said predetermined sign upon shifting said spot from a post recorded area of one of said track elements to the neighboring intertrack land.

3. Optical device according to claim 1, characterised in that the width of the said track elements exceeds the width of the said track interstices; the forming of the said recordable layer giving rise to an increase of the radiation picked up by the said detector means.

4. Optical device according to claim 3, characterised in that the recordable layer is deformed without tearing during the recording process; the said deformation causing an increase of reflectivity.

5. Optical device according to claim 3, characterised in that the recordable layer comprises a film deposited on a reflective sub layer; the recording process causing the ablation of the said film in such manner as to obtain an increase of the reflectivity of the said layer.

6. Optical device according to claim 3, characterised in that the said disc being permeable with respect to the lighting radiation, the recordable layer transmits a radiation to the said detector means; the recording process causing the ablation of a semitransparent film in such manner as to increase the transmissivity of the said disc.

7. Optical device according to claim 2, characterised in that the width of the said track elements is smaller than the width of the track interstices; the forming of the said recordable layer giving rise to a reduction of the radiation picked up by the said detector means.

8. Optical device according to claim 7, characterised in that the recordable layer is a reflective film, the recording process causing the ablation of the said film in such manner as to obtain a reduction of the reflectivity of the said disc.

9. Optical device according to claim 2, characterised in that the said spot is an AIRY spot.

10. Optical device according to claim 2, characterised in that the said spot is a luminous spot having a Gaussian distribution.

11. Optical device as claimed in claim 2, wherein the amount of post recording optical contrast is greater than said amount.

* * * * *